(12) United States Patent
Pullela et al.

(10) Patent No.: US 7,760,720 B2
(45) Date of Patent: Jul. 20, 2010

(54) TRANSLATING NATIVE MEDIUM ACCESS CONTROL (MAC) ADDRESSES TO HIERARCHICAL MAC ADDRESSES AND THEIR USE

(75) Inventors: Venkateshwar Rao Pullela, San Jose, CA (US); Shyamasundar Kaluve, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1163 days.

(21) Appl. No.: 10/984,305

(22) Filed: Nov. 9, 2004

(65) Prior Publication Data

US 2006/0098644 A1 May 11, 2006

(51) Int. Cl.
*H04L 12/28* (2006.01)
(52) U.S. Cl. ..................... 370/389; 370/401
(58) Field of Classification Search .................. 370/389
See application file for complete search history.

(56) References Cited

U.S. PATENT DOCUMENTS

| | | | |
|---|---|---|---|
| 5,757,924 A | 5/1998 | Friedman et al. | |
| 6,006,272 A | 12/1999 | Aravamudan et al. | |
| 6,393,484 B1* | 5/2002 | Massarani ................... | 709/227 |
| 6,590,861 B1 | 7/2003 | Vepa et al. | |
| 6,697,873 B1 | 2/2004 | Yik et al. | |
| 6,912,590 B1* | 6/2005 | Lundback et al. ........... | 709/238 |
| 2003/0076830 A1 | 4/2003 | Asano | |
| 2003/0227930 A1 | 12/2003 | Choi et al. | |
| 2004/0264458 A1* | 12/2004 | Six ............................ | 370/389 |
| 2005/0027881 A1* | 2/2005 | Figueira et al. ............. | 709/238 |
| 2005/0060585 A1* | 3/2005 | Murakoshi .................. | 713/201 |
| 2006/0120517 A1* | 6/2006 | Moon et al. ................. | 379/45 |
| 2007/0025366 A1* | 2/2007 | Shahrier et al. ............. | 370/400 |

OTHER PUBLICATIONS

Kohler et al., "Modular Components for Network Address Translation," Open Architectures and Network Programming Proceedings, 2002 IEEE, Jun. 28-29, 2002, pp. 39-50.
Ilija Hadzic, "Hierarchical MAC Address Space in Public Ethernet Networks," IEEE 2001, 0-7803-7206-9/01, pp. 1563-1569.
Plummer, "An Ethernet Address Resolution Protocol," RFC 826, The Internet Society, Nov. 1982, 13 pages.
Comer, "Mapping Internet Addresses to Physical Addresses (ARP)," Internetworking with TCP/IP Principles, Protocols, and Architectures, vol. 1, Fourth Ed., Chapter 6, pp. 77-78, 2000.

* cited by examiner

*Primary Examiner*—Rafael Pérez-Gutiérrez
*Assistant Examiner*—German Viana Di Prisco
(74) *Attorney, Agent, or Firm*—The Law Office of Kirk D. Williams (57) ABSTRACT

Different mechanisms are disclosed for translating native Media Access Control (MAC) addresses to and from corresponding hierarchical MAC addresses, and the use of such MAC addresses. A packet switch typically maintains a data structure relating native MAC addresses of certain devices with external MAC addresses, wherein each of the external MAC addresses is typically hierarchical in nature with a portion of the translated address identifying a switch local to the destination device and through which the destination device is to be reached. Other network elements can then readily determine where to route a packet with a destination identified by such a hierarchical MAC address without having to maintain such a large or complete database of MAC addresses as the packet can be routed to the switch based on a portion of the hierarchical address (e.g., typically without regard to the portion of the address identifying the actual destination device).

28 Claims, 7 Drawing Sheets

TRANSLATING NATIVE MEDIUM ACCESS CONTROL (MAC) ADDRESSES TO HIERARCHICAL MAC ADDRESSES AND THEIR USE

TECHNICAL FIELD

One embodiment of the invention relates to communications and computer systems, especially bridges, routers, packet switches, and other devices; and more particularly, one embodiment relates to translating native medium access control (MAC) addresses to hierarchical MAC addresses and their use.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

A network device, such as a bridge, switch or router, typically receives, processes, and forwards or discards a packet. Metropolitan and wide area networks (MANs and WANs) are based on various networking technologies. Increasingly, public and private communications networks are being built and expanded using various packet technologies, such as Internet Protocol (IP). Layer-3 routers are used to switch IP packets. Configuration of these routers and networks of these routers requires a certain skill level.

Bridges and networks of bridges, on the other hand, are typically easier to install and maintain and are typically used for implementing local area networks (LANs). A bridge typically sends and receives Ethernet and/or IEEE 802 packets, with each packet including source and destination medium access control (MAC) addresses. Each LAN communications interface of a device typically is assigned a MAC address. The IEEE now, and formally Xerox Corporation, is the official global authority for assigning blocks of MAC addresses to companies, typically to communications device and interface manufactures, so that each MAC address will be globally unique. These addresses can be considered "flat addresses" because they inherently provide no routing information, and any address can be located anywhere in a network. An IEEE 802 MAC address indicates that it is a globally managed address by setting the G/L (global/local) bit of the 48-bit MAC address to zero. Otherwise, the G/L bit is set to one to indicate that the MAC address is locally administered and any MAC address can be used. It is typically up to a network manager to assign local addresses to interfaces to ensure that no address is used more than once in a bridged network.

To appropriately forward these flat MAC addresses, a bridge or other switching device must keep track of each MAC address that passes through it, as well as an association with an interface from which to send a packet to reach the host interface with that MAC address. However, this approach is becoming problematic as the size of these bridged networks is expanding beyond the traditional view of a LAN, and the number of hosts and thus MAC interfaces which must be remembered by a bridge is exploding, which increasingly adds device storage and processing requirements, and thus cost to each bridge.

SUMMARY

Disclosed are, inter alia, methods, apparatus, data structures, computer-readable media, and mechanisms for translating native medium access control (MAC) addresses to hierarchical MAC addresses and their use, such as in or by a computer or communications device.

One embodiment for communicating information through a switch maintains a data structure relating native Media Access Control (MAC) addresses of devices and external MAC addresses, wherein each of the external MAC addresses comprises a hierarchical address typically including two or more levels of hierarchy, each of which may represent a logical entity (e.g., identify a service provider) or a physical entity (e.g., a physical switch or other device). The number of levels of hierarchy may vary among embodiments and is typically chosen to meet the needs of the application. For example, one embodiment includes two levels of hierarchy, such as a portion identifying the switch and a second portion identifying a device. One embodiment includes three levels of hierarchy, such portions identifying an Internet Service Provider, a local Internet Service Provider, and a device. One embodiment includes four levels of hierarchy, such portions identifying an Internet Service Provider, a local Internet Service Provider, a physical switch, and a device.

One embodiment for communicating information through a switch maintains a data structure relating native Media Access Control (MAC) addresses of devices and external MAC addresses, wherein each of the external MAC addresses comprises a hierarchical address typically including a portion identifying the switch and a second portion identifying a device of which the hierarchical address represents. A first packet including a first native MAC address as its source address is received, and in response, the first native MAC address is translated to a first external MAC address based on the MAC address information maintained in the data structure and a second packet including the first external MAC address as its source address is sent, with the second packet being generated based on the contents of the first packet. A third packet including the first external MAC address as its destination is received, and in response, the first external MAC address is translated to the first native MAC address, and a fourth packet including the first native MAC address as its destination address is sent, with the fourth packet being generated based on the contents of the third packet. Of course, typically a new Frame Check Sequence (FCS) must be calculated for each translated packet.

In one embodiment, the native MAC addresses are flat addresses. In one embodiment, an authentication request is received from a first local device associated with the first native MAC address, and in response, the first local device is authenticated and the data structure is updated with the association between the first native MAC address and the first external MAC address. In one embodiment, the first native MAC address corresponds to a device local to the switch. In one embodiment, authentication is optional or not used as the associations between native and external MAC addresses are implicit or occur without any special authorization (e.g., especially, such as in a secure or private network where extra security authorization procedures are not always used). In one embodiment, the first packet includes an indication that the first native MAC address is a globally assigned MAC address, and the second packet includes an indication that the first external MAC address is a locally assigned MAC address. In one embodiment, the first native MAC address includes an indication that it is a globally assigned MAC address, and the first external MAC address includes an indication that it is a locally assigned MAC address. In one embodiment, the hierarchical address includes one or more network identification portions.

One embodiment for communicating information through a switch maintains a data structure relating native Media Access Control (MAC) addresses of devices and external MAC addresses, wherein each of the external MAC addresses comprises a hierarchical address including a portion identifying the switch and a second portion identifying a device of which the hierarchical address represents. A request packet from a source to identify a destination MAC address based on a higher-level protocol destination address, the request packet including a native MAC address as its source MAC address, and in response, identifying an external address corresponding to the native MAC address based on the data structure and sending a translated request packet based on the request packet to identify the destination MAC address, the translated request packet including the external address as its source MAC address, wherein the external MAC address comprises a hierarchical address including a portion identifying the switch and a second portion identifying a device associated with the native MAC address. A reply packet to the translated request packet is received, with the reply packet including the external MAC address, the external MAC address is translated to the native MAC address based on the data structure, and a translated reply packet including the native MAC address is sent, with the translated reply packet being generated based on the contents of the reply packet.

In one embodiment, the native MAC address is a flat address. One embodiment receives an authentication request from a first local device associated with the native MAC address, and in response, the first local device is authenticated and the data structure is updated with the association between the native MAC address and the external MAC address. In one embodiment, the native MAC address corresponds to a device local to the switch. In one embodiment, the external MAC address includes an indication that it is a locally assigned MAC address, and the native MAC address includes an indication that it is a globally assigned MAC address. In one embodiment, the request packet includes an indication that the native MAC address is a globally assigned MAC address, and the translated request packet includes an indication that the external MAC address is a locally assigned MAC address. In one embodiment, the hierarchical address includes one or more network identification portions.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Disclosed are, inter alia, methods, apparatus, data structures, computer-readable media, and mechanisms for translating native medium access control (MAC) addresses to hierarchical MAC addresses and their use, such as in or by a computer or communications device.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium or media containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising", which is synonymous with "including," "containing," or "characterized by," is inclusive or open-ended and does not exclude additional, unrecited elements or method steps.

Different mechanisms are disclosed for translating native Media Access Control (MAC) addresses to and from corresponding hierarchical MAC addresses, and the use of such MAC addresses. A packet switch typically maintains a data structure relating native MAC addresses of certain devices with external MAC addresses, wherein each of the external MAC addresses is typically hierarchical in nature with a portion of the translated address identifying a switch local to the destination device and through which the destination device is to be reached. Other network elements can then readily determine where to route a packet with a destination identified by such a hierarchical MAC address without having to maintain such a large or complete database of MAC addresses as the packet can be routed to the switch based on a portion of the hierarchical address (e.g., typically without regard to the portion of the address identifying the actual destination device).

One embodiment for communicating information through a switch maintains a data structure relating native Media Access Control (MAC) addresses of devices and external MAC addresses, wherein each of the external MAC addresses comprises a hierarchical address typically including two or more levels of hierarchy, each of which may represent a logical entity (e.g., identify a service provider) or a physical entity (e.g., a physical switch or other device). The number of levels of hierarchy may vary among embodiments and is typically chosen to meet the needs of the application. For example, one embodiment includes two levels of hierarchy, such as a portion identifying the switch and a second portion identifying a device. One embodiment includes three levels of hierarchy, such portions identifying an Internet Service Provider, a local Internet Service Provider, and a device. One embodiment includes four levels of hierarchy, such portions identifying an Internet Service Provider, a local Internet Service Provider, a physical switch, and a device.

One embodiment for communicating information through a switch maintains a data structure relating native Media Access Control (MAC) addresses of devices and external MAC addresses, wherein each of the external MAC addresses comprises a hierarchical address typically including a portion identifying the switch and a second portion identifying a device of which the hierarchical address represents. A first packet including a first native MAC address as its source address is received, and in response, the first native MAC address is translated to a first external MAC address based on the MAC address information maintained in the data structure and a second packet including the first external MAC address as its source address is sent, with the second packet being generated based on the contents of the first packet. A third packet including the first external MAC address as its destination is received, and in response, the first external MAC address is translated to the first native MAC address, and a fourth packet including the first native MAC address as its destination address is sent, with the fourth packet being generated based on the contents of the third packet. Of course, typically a new Frame Check Sequence (FCS) must be calculated for each translated packet.

In one embodiment, the native MAC addresses are flat addresses. In one embodiment, an authentication request is received from a first local device associated with the first native MAC address, and in response, the first local device is authenticated and the data structure is updated with the association between the first native MAC address and the first external MAC address. In one embodiment, the first native MAC address corresponds to a device local to the switch. In one embodiment, authentication is optional or not used as the associations between native and external MAC addresses are implicit or occur without any special authorization (e.g., especially, such as in a secure or private network where extra security authorization procedures are not always used). In one embodiment, the first packet includes an indication that the first native MAC address is a globally assigned MAC address, and the second packet includes an indication that the first external MAC address is a locally assigned MAC address. In one embodiment, the first native MAC address includes an indication that it is a globally assigned MAC address, and the first external MAC address includes an indication that it is a locally assigned MAC address. In one embodiment, the hierarchical address includes one or more network identification portions.

One embodiment for communicating information through a switch maintains a data structure relating native Media Access Control (MAC) addresses of devices and external MAC addresses, wherein each of the external MAC addresses comprises a hierarchical address including a portion identifying the switch and a second portion identifying a device of which the hierarchical address represents. A request packet from a source to identify a destination MAC address based on a higher-level protocol destination address, the request packet including a native MAC address as its source MAC address, and in response, identifying an external address corresponding to the native MAC address based on the data structure and sending a translated request packet based on the request packet to identify the destination MAC address, the translated request packet including the external address as its source MAC address, wherein the external MAC address comprises a hierarchical address including a portion identifying the switch and a second portion identifying a device associated with the native MAC address. A reply packet to the translated request packet is received, with the reply packet including the external MAC address, the external MAC address is translated to the native MAC address based on the data structure, and a translated reply packet including the native MAC address is sent, with the translated reply packet being generated based on the contents of the reply packet.

In one embodiment, the native MAC address is a flat address. One embodiment receives an authentication request from a first local device associated with the native MAC address, and in response, the first local device is authenticated and the data structure is updated with the association between the native MAC address and the external MAC address. In one embodiment, the native MAC address corresponds to a device local to the switch. In one embodiment, the external MAC address includes an indication that it is a locally assigned MAC address, and the native MAC address includes an indication that it is a globally assigned MAC address. In one embodiment, the request packet includes an indication that the native MAC address is a globally assigned MAC address, and the translated request packet includes an indication that the external MAC address is a locally assigned MAC address. In one embodiment, the hierarchical address includes one or more network identification portions.

Figure 1A:
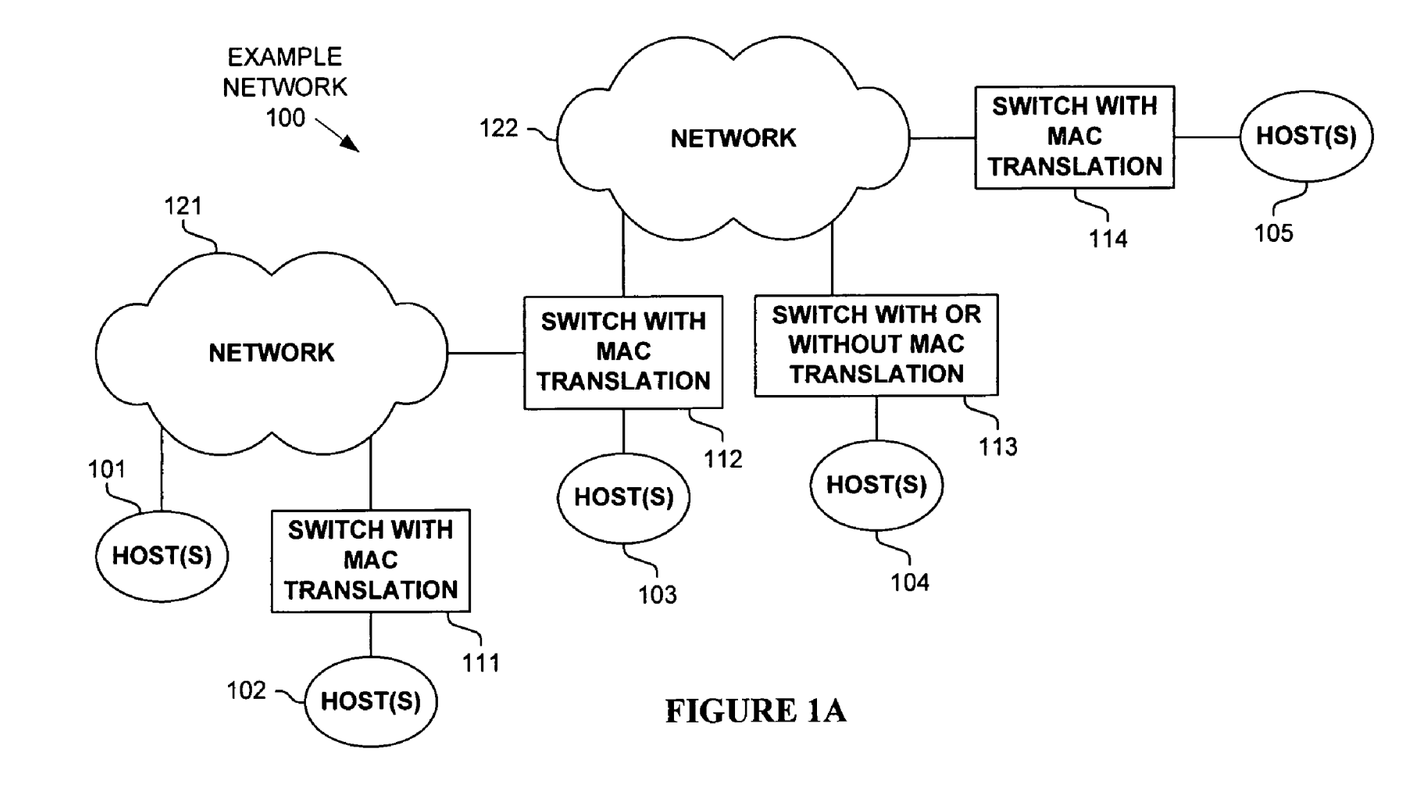
FIG. 1A is a block diagram illustrating a network using one or more embodiments.

FIG. 1A is a block diagram illustrating an exemplary network 100 using one or more embodiments. As shown, exemplary network includes multiple one or more hosts 101-105, networks 121 and 122 (e.g., sub-networks of network 100), and switches 111-114. Note, hosts 101-105 can be local (e.g., directly connected or via a hub, etc.) to a switch performing the translation of its MAC addresses or even remote (which, for example, might especially make sense at a gateway of a company or administrative domain, etc.). Also note, that each line connecting a host to a switch or network represents one or more connections, and not necessarily a single connection. Example network 100 includes both switches that support MAC address translation (e.g., switches 111, 113 and 114) as well as switches that do not support MAC address translation (e.g., switch 112). One embodiment performs the hierarchical address translation at multiple locations in a network; while one embodiment only performs the hierarchical address translation at network boundary switches.

Figure 1B:
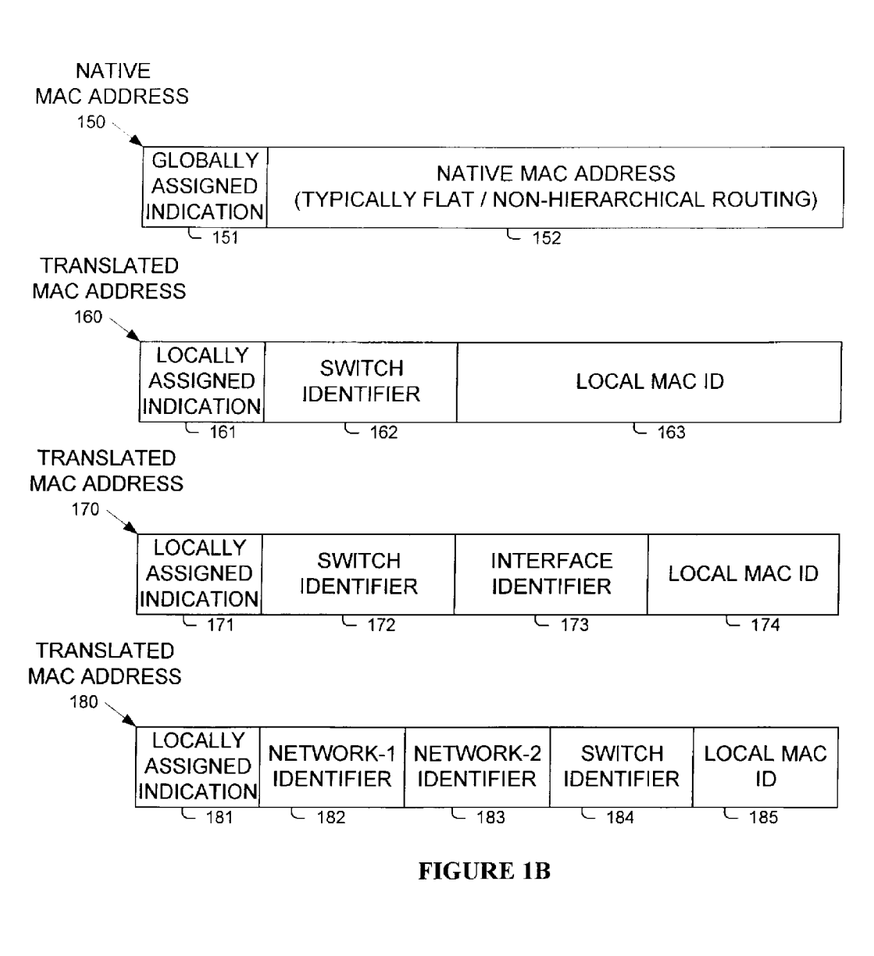
FIG. 1B is a block diagram illustrating some of an unlimited number of possible native and translated MAC addresses used by an embodiment.

One embodiment translates native MAC addresses (e.g., original or already translated MAC addresses—in other words an address native to the switch or other communications device performing the translation) to another MAC address (e.g., to the translated MAC address). For example, FIG. 1B illustrates fields of a native MAC address 150 (used in one embodiment), which typically includes an indication 151 that it is a globally assigned address (e.g., the G/L bit of an IEEE 802 48-bit MAC address), as well as other value bits (152) of the native MAC address, which can be a flat or a non-flat MAC address. Note, one embodiment will translate native MAC addresses having the format of a 48-bit IEEE 802 MAC address.

FIG. 1B also illustrates an exemplary translated MAC address 160, which typically includes an indication 161 that the MAC address has been locally assigned (e.g., it is not an IEEE assigned address), as well as a portion 162 identifying the switch performing the translation, and a portion 163, typically a local MAC identification value used in uniquely identifying the associated native MAC address.

Shown also in FIG. 1B is another exemplary translated MAC address 170, which typically includes an indication 171 that the MAC address has been locally assigned, as well as a portion 172 identifying the switch performing the translation, a portion 173 identifying the interface from which to reach the interface having the native MAC address, and a portion 174, typically a local MAC identification value used in uniquely identifying the associated native MAC address.

Also shown in FIG. 1B is another exemplary translated MAC address 180, which typically includes an indication 181 that the MAC address has been locally assigned, as well as one or more network identification portions 182-183 identifying corresponding one or more logical or physical networks, a portion 184 identifying the switch performing the translation, and a portion 185, typically a local MAC identification value used in uniquely identifying the associated native MAC address.

Note, shown in FIG. 1B are simply a few of an unlimited number of possible packet formats that can be translated by one or more embodiments. By including a switch identification field in a MAC address, a device can simply determine, based on the value of this field, where to route a packet without having to determine the route based on the entire MAC address, and thus, fewer entries will typically be stored in a MAC routing table.

Figure 2:
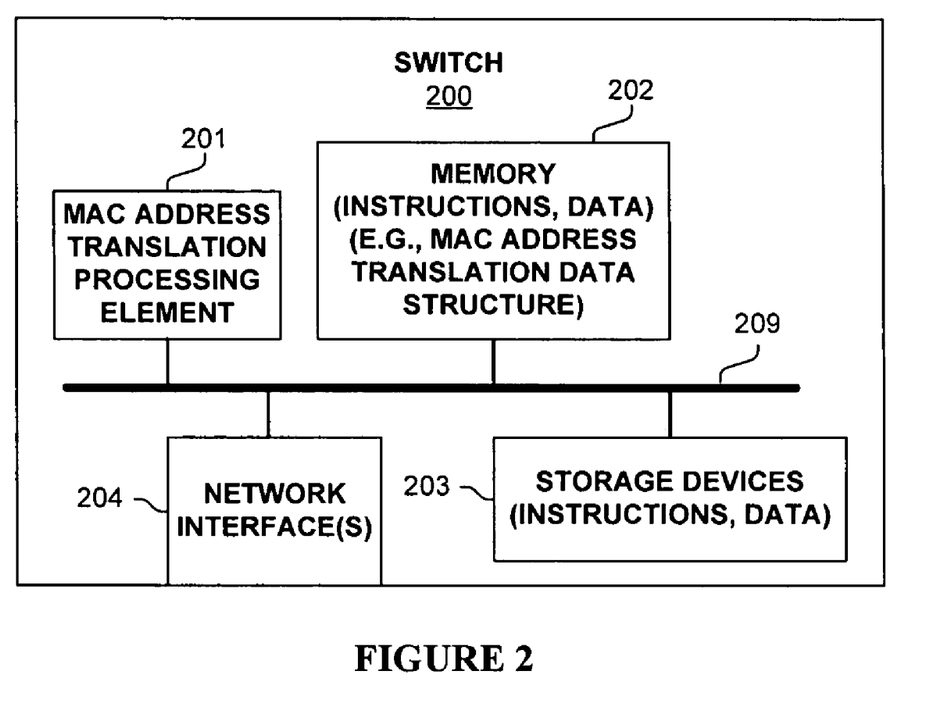
FIG. 2 is a block diagram of a switch used in one embodiment for translating and/or using translated MAC addresses.

FIG. 2 is a block diagram of an exemplary switch 200 (or switching component) used in one embodiment for translating and/or using translated MAC addresses. In one embodiment, system or component 200 performs one or more processes corresponding to one or more of the diagrams illustrated or otherwise described herein.

In one embodiment, component 200 includes a processing element 201 (e.g., a processor, customized logic, etc.), memory 202 (e.g., for storing a MAC address translation data structure), storage devices 203 (e.g., for storing a MAC address translation data structure), and one or more networks interface 204 for receiving and sending packets, items, and/or other information, which are typically coupled via one or more communications mechanisms 209 (shown as a bus for illustrative purposes.) Various embodiments of component 200 may include more or less elements. For example, one embodiment also includes an associative memory for use in performing the translation between addresses as an associate memory provides an efficient mechanism for identifying whether or not a matching value exists. If a match exists, a memory lookup is then typically performed in a random access memory based on the matching location in the associative memory to retrieve the associated address. Of course, there are many different techniques for performing this address translation which can be used in an embodiment.

The operation of component 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with the invention. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with the invention.

Figure 3A:
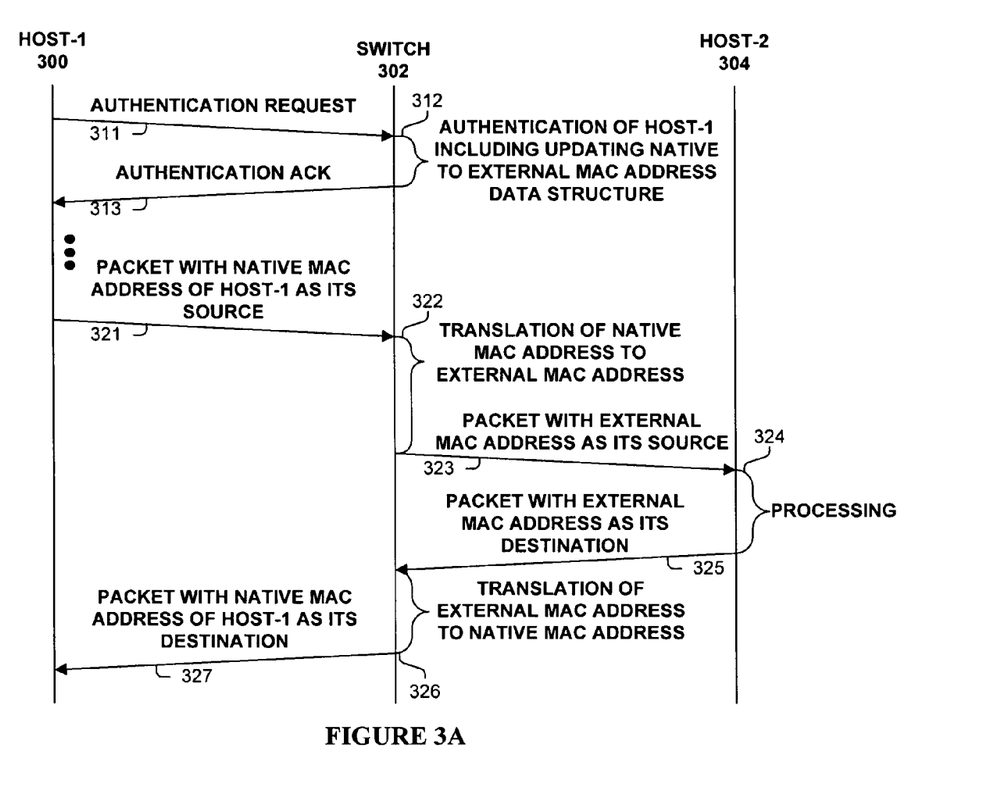
FIG. 3A is a message sequence chart illustrating messages received, processed and sent in one embodiment.

FIG. 3A is a message sequence chart illustrating messages received, processed and sent in one embodiment. In one embodiment, host-1 300 sends an authentication request 311 to switch 302, which then performs an authentication process 312. In response to a successful authentication, switch 302 updates a data structure to reflect the association of the native MAC address with an external MAC address (which typically includes a portion identifying switch 302 and a portion identifying host-1 300), and sends host-1 300 an indication that it has been authenticated. This is a process used in one embodiment. However, one embodiment does not require authentication, and in which case (or in addition to such authentication), the updating of the data structure relating native MAC addresses to external MAC addresses is manually configured or dynamically done in response to a native MAC address not currently associated with an external MAC address.

FIG. 3A also illustrates typical native MAC address to external MAC address and external MAC address to native MAC address translations. As illustrated, host-1 300 sends (321) a packet with a native MAC address as its source address. Switch 302 receives this packet, translates (322) the native MAC address to an external MAC address (typically by referencing a MAC address translation data structure, including possibly dynamically associating a new external MAC address with the native MAC address), and then sends (323) a packet created based on the received packet and with the external MAC address as its source (in place of the native MAC address).

Host-2 receives this packet (possibly directly from switch 302 or via many hops in a network) and processes (324) it. Typically, host-2 304 will send (325) a packet to host-1 300, in which case it uses the external MAC address as the destination address to reach host-1 300. Switch 302 will receive this packet, translate (326) the external MAC address to the native MAC address, and send (327) a packet with the native MAC address as its destination to host-1 (300). Note, in one embodiment, MAC address translation is performed for both or all communicating hosts (i.e., not just for one host).

Figure 3B:
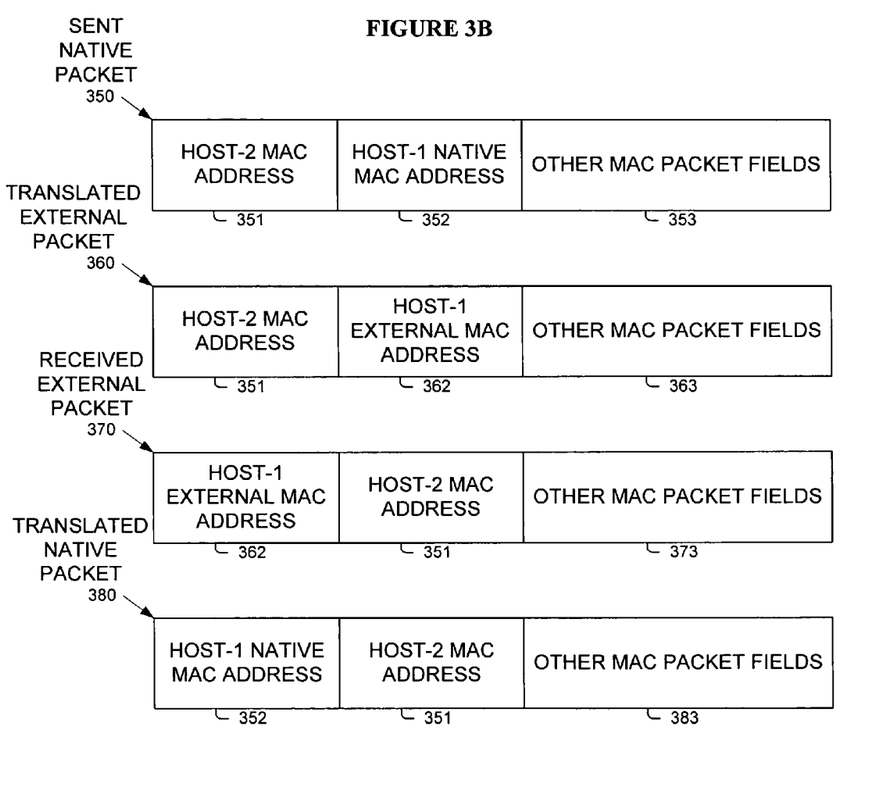
FIG. 3B is a block diagram illustrating packets used in one embodiment.

FIG. 3B further illustrates the translation of MAC addresses for packet 350, 360, 370, and 380 as performed in one embodiment. Shown is a typical sent native packet 350, which includes a destination address of the MAC address 351 of host-2 (304), a source address of the native MAC address 353 of host-1 (300), and other packet fields 353. Switch 302 translates native MAC address 353 to host-1 external MAC address 362, and forms and sends translated external packet 360, which includes a destination address of host-2 MAC address 351, a source address of host-1 external MAC address 362, and other packet fields 363.

In the reverse direction, a received external packet 370 (received by switch 302) includes a destination address of host-1 external MAC address 362, host-2 MAC address 351, and other packet fields 373. Switch 302 translates host-1 external MAC address field to host-1 native MAC address field 352, and forms and sends translated native packet 380 including a destination address of host-1 native MAC address field 352, a source address of host-2 MAC address 351, and other packet fields 383.

Figure 4A:
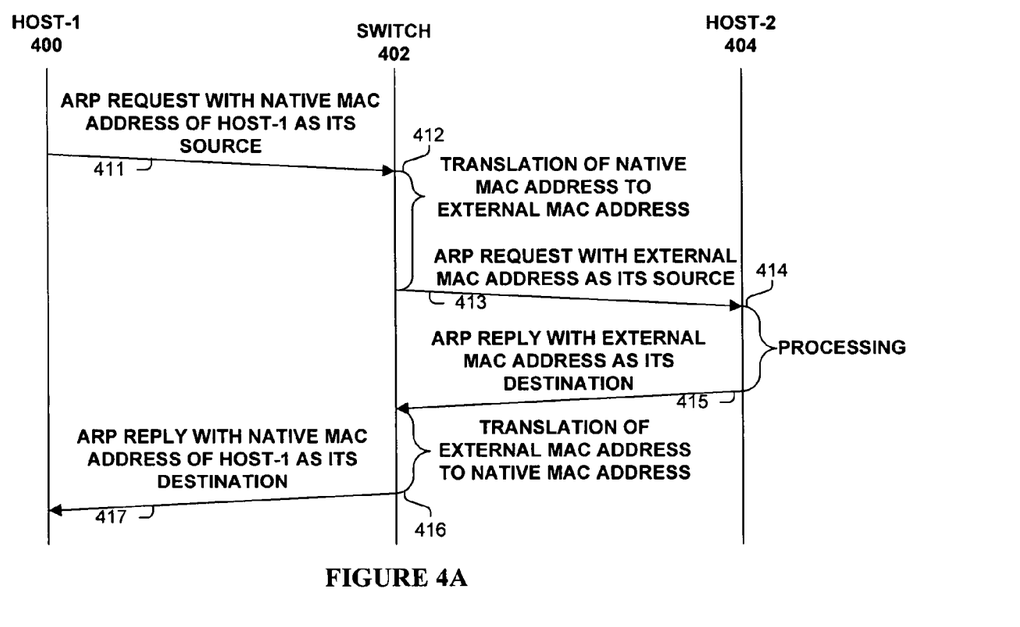
FIG. 4A is a message sequence chart illustrating messages received, processed and sent in one embodiment.
Figure 4B:
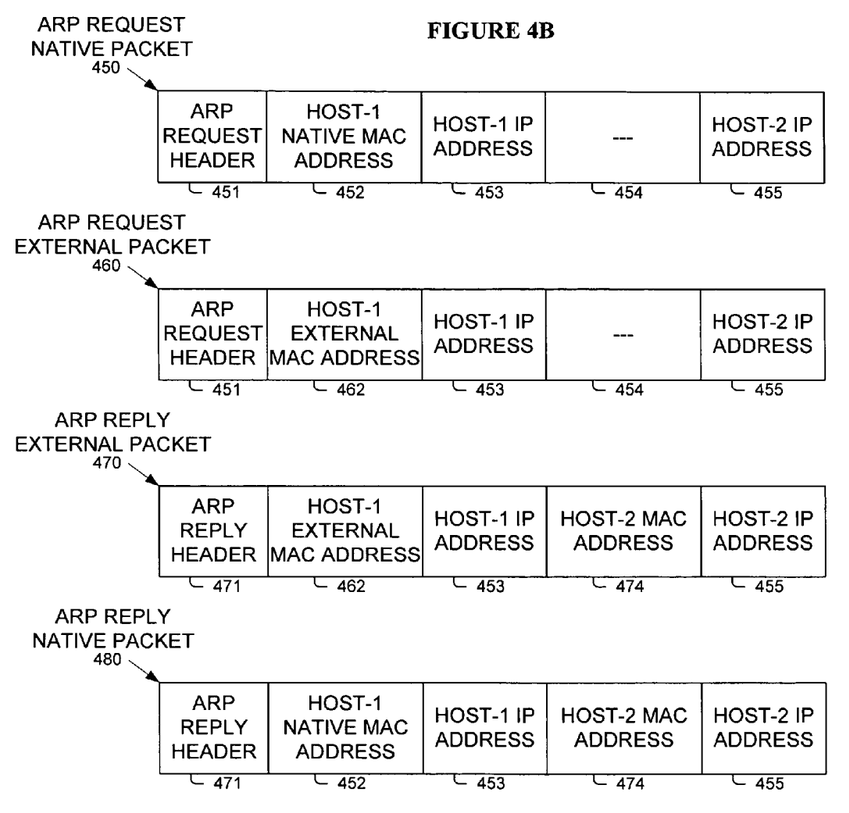
FIG. 4B is a block diagram illustrating Address Resolution Protocol (ARP) packets used in one embodiment.

FIGS. 4A-B illustrate MAC address translation in the context of Address Resolution Protocol (ARP), used to identify the MAC address corresponding to a remote IP address. Note, ARP is only one example of a network protocol that requires hierarchical address translation, and in one embodiment, one or more other protocols are also similarly translated.

Turning to FIG. 4A, host-1 400 sends (411) an ARP request with host-1's 400 native MAC address as its source address. Switch 402 receives the ARP request, and translates (412) the native MAC address to an external MAC address (typically by referencing a MAC address translation data structure, including possibly dynamically associating a new external MAC address with the native MAC address), and then sends (413) an ARP request packet created based on the received packet and with the external MAC address as its source (in place of the native MAC address).

Host-2 receives the ARP request packet (possibly directly from switch 402 or via many hops in a network) and processes (414) it. Host-2 404 sends (415) an ARP reply packet to host-1 400, in which case it uses the external MAC address as the destination address to reach host-1 400. Switch 402 will receive this packet, translate (416) the external MAC address to the native MAC address, and send (417) the translated ARP reply packet with the native MAC address as its destination to host-1 (400). Note, in one embodiment, MAC address translation is performed for both or all communicating hosts (i.e., not just for one host).

FIG. 4B further illustrates the translation of MAC addresses for ARP packets 450, 460, 470, and 480 as performed in one embodiment. Shown is a typical sent ARP request packet 450, which includes an ARP request header 451, the source native MAC address 452, the source IP address 453, a blank field 454, and a destination IP address 455 of host-2. This ARP request is translated by a switch to ARP request external packet 460, which includes an ARP request header 451, the source external MAC address 462 (translated from native MAC address 452), the source IP address 453, a blank field 454, and a destination IP address 455 of host-2.

In response, a typical ARP reply external packet 470 is received by a switch, with reply external packet 470 typically including an ARP reply header 471, the source external MAC address 462, the source IP address 453, host-2 MAC address 474 (either a native or external MAC address depending on whether a switch translates it or not), and a destination IP address 455 of host-2. This ARP reply is translated by a switch to ARP reply native packet 480, which includes ARP reply header 471, the source native MAC address 452, the source IP address 453, host-2 MAC address 474, and a destination IP address 455 of host-2.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for communicating information through a switch, the method comprising:

maintaining a data structure relating native Media Access Control (MAC) addresses of devices and external MAC addresses, wherein each of said external MAC addresses comprises a hierarchical address including a portion identifying the switch and a second portion identifying a device of which the hierarchical address represents;

receiving a request packet from a source to identify a destination MAC address based on a higher-level protocol destination address, with the request packet including: (1) a native MAC address as: (a) its source MAC address in the header of the request packet and (b) as a hardware address of the sender of the request packet in the packet data of the request packet, and (2) the higher-level protocol destination address in the packet data of the request packet; and in response: identifying an external address corresponding to the native MAC address based on the data structure and sending a translated request packet based on the request packet to identify the destination MAC address, the translated request packet including: (1) the external address as its source MAC address in the header of the translated request packet, and (2) the external MAC address as the hardware address of the sender in the packet data of the request packet, and (3) the higher-level protocol destination address in the packet data of the request packet; wherein the external MAC address comprises a hierarchical address including a portion identifying the switch and a second portion identifying a device associated with the native MAC address; and receiving a reply packet to the translated request packet, the reply packet including: (1) the external MAC address (a) in the header of the request packet and (b) as a hardware address of the sender of the request packet in the packet data of the reply packet, and (2) the destination MAC address in the packet data of the reply packet, and in response, translating the external MAC address to the native MAC address based on the data structure, and sending a translated reply packet including: the native MAC address as its destination MAC address in the header of the translated request packet, and packet data including: (1) the native MAC address as the hardware address of the sender of the request packet, and (2) the destination MAC address, with the translated reply packet being generated based on the contents of the reply packet.

2. The method of claim 1, wherein the native MAC address is a flat address.

3. The method of claim 1, comprising receiving an authentication request from a first local device associated with the native MAC address, and in response, authenticating the first local device and updating the data structure, in response to said authentication of the first local device, with the association between the native MAC address and the external MAC address.

4. The method of claim 1, wherein the native MAC address corresponds to a device local to the switch.

5. The method of claim 1, wherein the external MAC address includes an indication that it is a locally assigned MAC address, and the native MAC address includes an indication that it is a globally assigned MAC address.

6. The method of claim 1, wherein the request packet includes an indication that the native MAC address is a globally assigned MAC address, and the translated request packet includes an indication that the external MAC address is a locally assigned MAC address.

7. The method of claim 1, wherein the hierarchical address includes one or more network identification portions.

8. An apparatus for switching packets, the apparatus comprising:
   means for maintaining a data structure relating native Media Access Control (MAC) addresses of devices and external MAC addresses, wherein each of said external MAC addresses comprises a hierarchical address including a portion identifying the apparatus for switching packets and a second portion identifying a device of which the hierarchical address represents;
   means for receiving a request packet from a source to identify a destination MAC address based on a higher-level protocol destination address, with the request packet including: (1) a native MAC address as: (a) its source MAC address in the header of the request packet and (b) as a hardware address of the sender of the request packet in the packet data of the request packet, and (2) the higher-level protocol destination address in the packet data of the request packet; and in response: identifying an external address corresponding to the native MAC address based on the data structure and sending a translated request packet based on the request packet to identify the destination MAC address, the translated request packet including: (1) the external address as its source MAC address in the header of the translated request packet, and (2) the external MAC address as the hardware address of the sender in the packet data of the request packet, and (3) the higher-level protocol destination address in the packet data of the request packet; wherein the external MAC address comprises a hierarchical address including a portion identifying the switch and a second portion identifying a device associated with the native MAC address; and
   means for receiving a reply packet to the translated request packet, the reply packet including: (1) the external MAC address (a) in the header of the request packet and (b) as a hardware address of the sender of the request packet in the packet data of the reply packet, and (2) the destination MAC address in the packet data of the reply packet, and in response, translating the external MAC address to the native MAC address based on the data structure, and sending a translated reply packet including: the native MAC address as its destination MAC address in the header of the translated request packet, and packet data including: (1) the native MAC address as the hardware address of the sender of the request packet, and (2) the destination MAC address, with the translated reply packet being generated based on the contents of the reply packet.

9. The apparatus of claim 8, wherein the native MAC address is a flat address.

10. The apparatus of claim 8, comprising means for receiving an authentication request from a first local device associated with the native MAC address, and in response, authenticating the first local device and updating the data structure, in response to said authentication of the first local device, with the association between the native MAC address and the external MAC address.

11. The apparatus of claim 8, wherein the native MAC address corresponds to a device local to the apparatus for switching packets.

12. The apparatus of claim 8, wherein the external MAC address includes an indication that it is a locally assigned MAC address, and the native MAC address includes an indication that it is a globally assigned MAC address.

13. The apparatus of claim 8, wherein the request packet includes an indication that the native MAC address is a globally assigned MAC address, and the translated request packet includes an indication that the external MAC address is a locally assigned MAC address.

14. The apparatus of claim 8, wherein the hierarchical address includes one or more network identification portions.

15. An apparatus comprising:
    one or more interfaces configured for sending and receiving packets;
    one or more memories; and
    one or more processing elements configured to perform operations, with said operations comprising:
    maintaining a data structure relating native Media Access Control (MAC) addresses of devices and external MAC addresses, wherein each of said external MAC addresses comprises a hierarchical address including a portion identifying the apparatus and a second portion identifying a device of which the hierarchical address represents;
    translating a request packet, received from a source, to a translated request packet for sending out of the apparatus; wherein the request packet is a request for identifying a destination MAC address based on a higher-level protocol destination address, with the request packet including: (1) a native MAC address as: (a) its source MAC address in the header of the request packet and (b) as a hardware address of the sender of the request packet in the packet data of the request packet, and (2) the higher-level protocol destination address in the packet data of the request packet; and wherein said translating the request packet includes: identifying an external address corresponding to the native MAC address based on the data structure and creating a translated request packet based on the request packet for identifying the destination MAC address, with the translated request packet including: (1) the external address as its source MAC address in the header of the translated request packet, and (2) the external MAC address as the hardware address of the sender in the packet data of the request packet, and (3) the higher-level protocol destination address in the packet data of the request packet; wherein the external MAC address comprises a hierarchical address including a portion identifying the apparatus and a second portion identifying a device associated with the native MAC address; and
    translating a reply packet, received in response to the translated request packet, to a translated reply packet for sending out of the apparatus, with the reply packet including: (1) the external MAC address (a) in the header of the request packet and (b) as a hardware address of the sender of the request packet in the packet data of the reply packet, and (2) the destination MAC address in the packet data of the reply packet; wherein said translating the reply packet includes translating the external MAC address to the native MAC address based on the data structure; and wherein the translated reply packet includes: the native MAC address as its destination MAC address in the header of the translated request packet, and packet data including: (1) the native MAC address as the hardware address of the sender of the request packet, and (2) the destination MAC address, with the translated reply packet being generated based on the contents of the reply packet.

16. The apparatus of claim 15, wherein the native MAC address is a flat address.

17. The apparatus of claim 15, wherein said operations include: updating the data structure, in response to authenticating a local device communicatively coupled to the apparatus, with the association between the native MAC address and the external MAC address.

18. The apparatus of claim 15, wherein the native MAC address corresponds to a local device communicatively coupled to the apparatus.

19. The apparatus of claim 15, wherein the external MAC address includes an indication that it is a locally assigned MAC address, and the native MAC address includes an indication that it is a globally assigned MAC address.

20. The apparatus of claim 15, wherein the request packet includes an indication that the native MAC address is a globally assigned MAC address, and the translated request packet includes an indication that the external MAC address is a locally assigned MAC address.

21. The apparatus of claim 15, wherein the hierarchical address includes one or more network identification portions.

22. One or more tangible computer-readable media encoded thereon with executable instructions for performing operations when said instructions are executed by one or more processing elements of an apparatus, said operations comprising:

maintaining a data structure relating native Media Access Control (MAC) addresses of devices and external MAC addresses, wherein each of said external MAC addresses comprises a hierarchical address including a portion identifying the apparatus and a second portion identifying a device of which the hierarchical address represents;

translating a request packet, received from a source, to a translated request packet for sending out of the apparatus; wherein the request packet is a request for identifying a destination MAC address based on a higher-level protocol destination address, with the request packet including: (1) a native MAC address as: (a) its source MAC address in the header of the request packet and (b) as a hardware address of the sender of the request packet in the packet data of the request packet, and (2) the higher-level protocol destination address in the packet data of the request packet; and wherein said translating the request packet includes: identifying an external address corresponding to the native MAC address based on the data structure and creating a translated request packet based on the request packet for identifying the destination MAC address, with the translated request packet including: (1) the external address as its source MAC address in the header of the translated request packet, and (2) the external MAC address as the hardware address of the sender in the packet data of the request packet, and (3) the higher-level protocol destination address in the packet data of the request packet; wherein the external MAC address comprises a hierarchical address including a portion identifying the apparatus and a second portion identifying a device associated with the native MAC address; and translating a reply packet, received in response to the translated request packet, to a translated reply packet for sending out of the apparatus, with the reply packet including: (1) the external MAC address (a) in the header of the request packet and (b) as a hardware address of the sender of the request packet in the packet data of the reply packet, and (2) the destination MAC address in the packet data of the reply packet; wherein said translating the reply packet includes translating the external MAC address to the native MAC address based on the data structure; and wherein the translated reply packet includes: the native MAC address as its destination MAC address in the header of the translated request packet, and packet data including: (1) the native MAC address as the hardware address of the sender of the request packet, and (2) the destination MAC address, with the translated reply packet being generated based on the contents of the reply packet.

23. The computer-readable media of claim 22, wherein the native MAC address is a flat address.

24. The computer-readable media of claim 22, wherein said operations include: updating the data structure, in response to authenticating a local device communicatively coupled to the apparatus, with the association between the native MAC address and the external MAC address.

25. The computer-readable media of claim 22, wherein the native MAC address corresponds to a local device communicatively coupled to the apparatus.

26. The computer-readable media of claim 22, wherein the external MAC address includes an indication that it is a locally assigned MAC address, and the native MAC address includes an indication that it is a globally assigned MAC address.

27. The computer-readable media of claim 22, wherein the request packet includes an indication that the native MAC address is a globally assigned MAC address, and the translated request packet includes an indication that the external MAC address is a locally assigned MAC address.

28. The computer-readable media of claim 22, wherein the hierarchical address includes one or more network identification portions.

* * * * *